Figure 1:
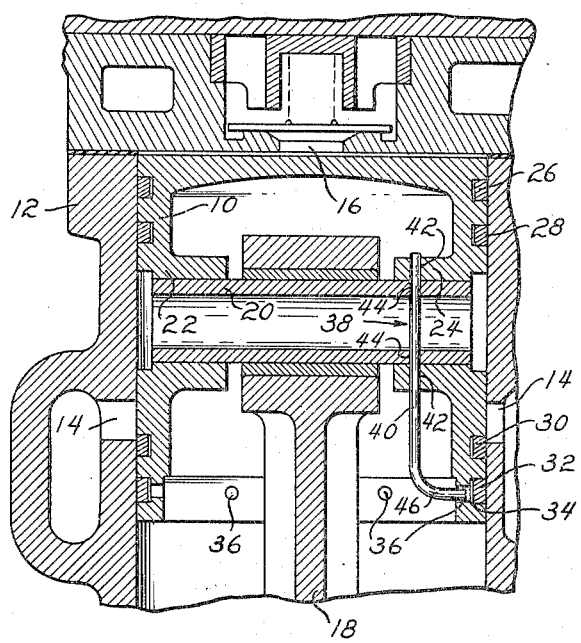

May 31, 1955     H. M. VALENTINE     2,709,628
PISTON PIN FASTENER
Filed April 27, 1950

INVENTOR
HARRY M. VALENTINE

BY Scrivener & Parker
ATTORNEYS

United States Patent Office 2,709,628
Patented May 31, 1955

2,709,628

PISTON PIN FASTENER

Harry M. Valentine, Elyria, Ohio, assignor to Bendix-Westinghouse Automotive Air Brake Company, Elyria, Ohio, a corporation of Delaware Application April 27, 1950, Serial No. 158,477

2 Claims. (Cl. 309—19)

This invention relates to pistons for compressors and the like and more particularly to a novel and improved construction for locking a piston pin in a piston.

One of the objects of the present invention is to provide a novel construction for locking or fastening a piston pin in the bosses of a piston, the arrangement being such that the construction is capable of being readily and quickly installed or removed.

A further object comprehends the provision of a fastener of the above character which is capable of ready removal for inspection and repair of the parts, and which may be again used after servicing operations are completed.

Other objects and novel features of the invention will appear more fully hereinafter from a consideration of the following detailed description when taken in connection with the accompanying drawing wherein one form of the invention is illustrated. It is to be expressly understood however, that the drawing is utilized for purposes of illustration only and is not to be taken as a definition of the limits of the invention, reference being had for this purpose to the appended claims.

Figure 2:
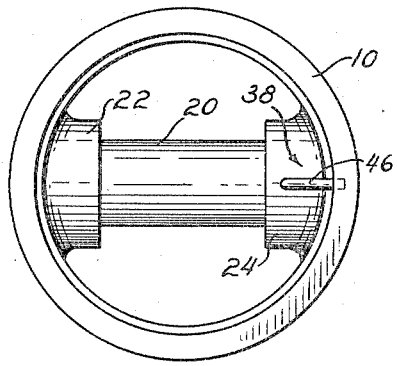

In the drawing wherein similar reference characters refer to similar parts throughout the several views, Fig. 1 is a vertical cross sectional view of a piston and a portion of a cylinder illustrating the locking means of the present invention; and Fig. 2 is a bottom view of the piston of Fig. 1.

Referring to the drawing, the present invention is illustrated therein as being associated with a piston 10 of the reciprocating type adapted for use in compressors or internal combustion engines, for example. More particularly, the piston 10 is mounted for reciprocation within a cylinder 12 provided with conventional inlet and outlet ports 14 and 16. For actuating the piston, a connecting rod 18 is connected at one end to a crank, not shown, and is rotatably connected at its other end to a piston pin 20, the latter being mounted within spaced apart bosses 22 and 24 formed on the piston. As shown, the piston is provided with the usual piston rings 26, 28, 30 and 32, the last mentioned ring being the oil ring which is mounted within a groove 34 provided with conventional oil return openings 36.

In accordance with the present invention, a novel locking or fastening device is provided for locking the piston pin 20 to the piston 10. More particularly, the locking device is constituted by an L-shaped pin 38 preferably formed of spring wire of circular cross section and provided with a long arm 40, projectible through aligned openings 42 and 44 in the boss 24 and in the piston pin 20 respectively. A short arm 46 is sprung into one of the oil return openings 36 in order to maintain the pin in a locked condition, it being pointed out that the latter opening is so arranged as to lie in a vertical plane passing through the openings 42 and 44 axially of the pin 20, in order to permit the assembly as above stated.

In operation, and after aligning the openings 42 and 44, the long arm 40 of the locking pin 38 is inserted through these openings. Thereafter, the pin is rotated about the axis of its long arm 40 in order to bring the end of the short arm 46 into registry with the opening 36, whereupon said end will be sprung into the latter opening to occupy the position illustrated. It will be understood that during this last named movement, the end of the short arm 46 will engage the inner wall of the piston skirt and that the long arm will be sprung slightly away from the skirt. However, as soon as the short arm becomes aligned with the opening 36, the long arm 44 will spring back to its normal vertical position and force the short arm into the said opening. When this is effected, the locking pin 38 is in an unstressed condition which materially increases the effective life of the pin.

It will be readily understood that when the parts occupy the positions shown, the piston pin 20 will be securely locked or fastened to the piston 10. It will be also seen that the pin 40 may be easily and readily removed from its locked position by merely reversing the operation outlined above. Thus it is only necessary to spring the long arm 40 a sufficient distance to permit withdrawal of the short arm 46 from the opening 36. Thereafter, the pin 38 is rotated about the axis of its long arm and as soon as the latter springs back to its straight, vertical position, the pin may be readily withdrawn from the openings 42 and 44.

From the foregoing, it will be appreciated that the locking pin of the present invention is capable of being quickly and easily assembled to its locking position without the necessity of employing any special tools or equipment. In addition, the construction is such that the pin may be easily unlocked and removed from the piston for subsequent locking use.

While one embodiment of the invention has been described herein with considerable particularity, it will be well understood by those skilled in the art, that various modifications may be resorted to without departing from the spirit of the invention. Reference will therefore be had to the appended claims for a definition of the limits of the invention.

What is claimed is:

1. In a hollow piston provided with spaced-apart aligned bosses, a piston pin mounted in said bosses, and means for detachably locking said pin in one of said bosses comprising a one-piece locking pin of spring wire, said pin having a pair of angularly related arms of different lengths, the longer arm freely projecting through transversely aligned openings in one of said bosses and in said pin to prevent axial movement of the pin with respect to the bosses and having sufficient length extending beyond said boss to enable the shorter arm being sprung into an opening in the skirt of the piston and extending freely into said last named opening to prevent axial movement of said locking pin with respect to the aligned openings in said boss and said piston pin.

2. In a hollow piston having a pair of spaced-apart aligned bosses and a radial opening through the inner surface of the skirt of said piston parallel to said bosses, a piston pin having opposite ends thereof mounted in said bosses comprising a one-piece L-shaped locking-pin of spring wire having a normally straight long arm freely extending through transversely aligned openings in said one boss and in one end of said pin to prevent axial movement of the pin with respect to the bosses, and having a short arm freely extending into an opening in the skirt of the piston, the distance between a plane perpendicular to the axis of said piston pin and tangental to the inner surface of the skirt and a parallel plane including the aligned opening being slightly less than the length of said short arm so that after the long arm is extended through said aligned openings, rotation of the pin about the long arm brings the free end of the short arm into engagement with the inner surface of the piston skirt to spring the free portion of the long arm away from said surface until the end of the short arm is aligned with the opening in the piston skirt, whereupon the end of the short arm will be sprung into said opening to freely extend therein by the return of the long arm to its normal straight position.

References Cited in the file of this patent

UNITED STATES PATENTS

| | | |
|---|---|---|
| 1,473,061 | Thomas | Nov. 6, 1923 |
| 1,838,216 | Dickey | Dec. 29, 1931 |
| 1,853,754 | Wagner | Apr. 12, 1932 |
| 1,992,708 | Mammen | Feb. 26, 1935 |

FOREIGN PATENTS

| | | |
|---|---|---|
| 278,487 | Great Britain | Oct. 13, 1927 |
| 462,809 | Germany | July 18, 1928 |